Patented Aug. 12, 1941

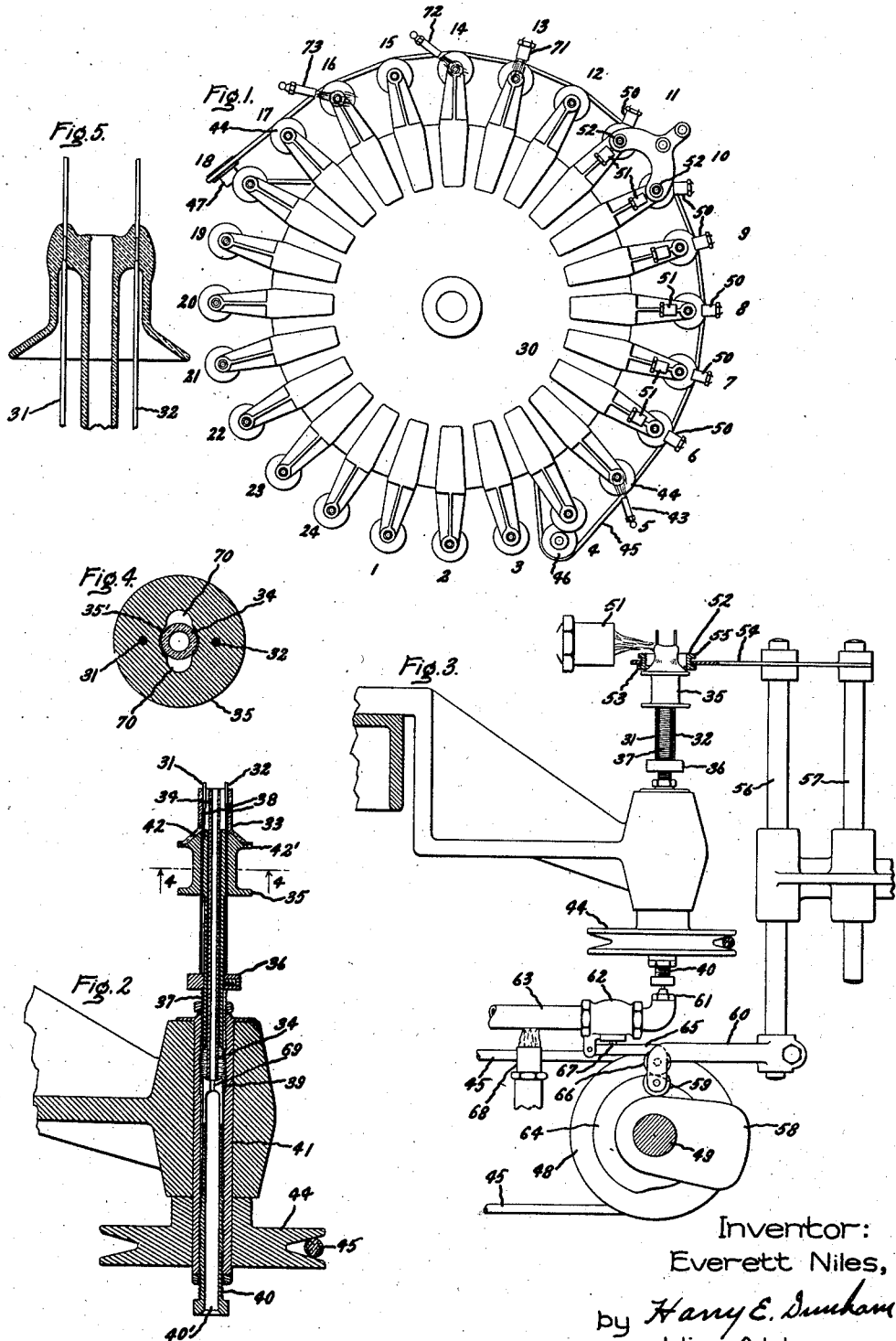

2,252,195

UNITED STATES PATENT OFFICE 2,252,195

STEM MAKING MACHINE

Everett Niles, Willoughby, Ohio, assignor to General Electric Company, a corporation of New York Application July 29, 1939, Serial No. 287,349

6 Claims. (Cl. 49—2)

My invention relates to apparatus for making stems for incandescent and arc lamps and other like electrical devices. More particularly, my invention relates to apparatus for supporting and holding in position those parts sealed together to form an extremely short stem preferably made in the manner disclosed in United States Patent 2,128,173, A. J. White, which is assigned to the assignee of the present invention.

In making extremely short stems, considerable difficulty has been experienced in holding and keeping the flared stem tube, the leading-in wires and the exhaust tube in proper relation while they are sealed together. Practically the entire stem tube except the flare portion thereof must be heated and fused during stem making and there is not sufficient material for it to be gripped and supported in an inverted manner as in existing apparatus. One object of my invention is to obviate the above holding and positioning difficulties by providing apparatus for supporting and positioning the stem tube, leading-in wires and exhaust tube in an upright position and for sealing said parts together in said position.

Another object of my invention is to provide apparatus for making economically and at a high rate of speed stems which are sufficiently free of strain to have good strength.

Other objects and advantages of my invention will appear from the following detailed description of a species thereof and from the drawing.

In the drawing, Fig. 1 is a plan view of a stem making machine embodying my invention; Fig. 2 is a vertical section through a head of the stem machine at the start of the stem making operation; Fig. 3 is a side elevation of the head and other apparatus associated therewith during the final shaping of said stem; Fig. 4 is a section through the holder of the head along line 4—4 of Fig. 2; and Fig. 5 is an enlarged vertical section through the stem manufactured in the instance shown.

The machine shown in Fig. 1 comprises twenty-four heads, each constructed as shown in Fig. 2 and advanced by indexing motions of the turret 30 to each of the twenty-four stations indicated in turn. While at the first four stations, the head is provided with the leading-in wires 31 and 32, the vitreous stem tube 33 and the exhaust tube 34 each being fed manually or mechanically as desired. It is preferred that the leading-in wires 31 and 32 be fed first as they are inserted in the smaller openings in the holder 35 and the exhaust tube 34 be inserted in the central opening 35' in said holder 35 next in order. The leading-in wires 31 and 32 are pushed down in the openings in the holder 35 until they rest on the adjustable collar 36 about the threaded lower portion 37 thereof at which time they are positioned longitudinally so that the intermediate section 38 of seal wire is correctly located. The exhaust tube 34 is pushed down in the holder 35 until it rests on the upper end 39 of the support 40 carried by the spindle 41. The next operation is the insertion of the flared stem tube 33 which is threaded over the upstanding ends of the leading-in wires 31 and 32 and the exhaust tube 34 and is rested on the conical seat 42 provided with the holder 35. The conical seat 42 and the raised edge 42' of the holder 35 which engages the outer periphery of the flared end of the stem tube 33 together position said tube 33 with respect to the other stem parts. The lower portion 37 of the holder 35 screws into the hollow spindle 41 and determines the elevation of the stem parts which are now arranged in sealing relation to each other in the machine.

The succeeding indexing movement of the head of the machine causes it to enter station 5 where it is made to rotate and the stem parts are preheated by the soft fire from the stationary burner 43. The rotative motion is imparted to the head by the engagement of the pulley 44 on the lower part of the spindle 41 with the moving belt 45 which is introduced at this point by the pulley 46. The belt 45 also extends around the pulleys 44 on each of the heads at stations 6–17 inclusive and passes off the final pulley 44 to pulley 47. Pulleys 46 and 47 are idle pulleys and co-operate with means (not shown) below the turret 30 in directing the belt 45 from and to the drive pulley 48 shown in Fig. 3 on the main drive shaft 49 of the machine. The burner 43 is mounted in the usual manner by means connected to the frame of the machine (not shown) below the turret 30.

In stations 6, 7, 8 and 9, the upper end of the stem tube 33 is melted down about the leads 31 and 32 and the exhaust tube 34 by the comparatively sharp flames from the burners 50 and 51 at each of these stations. A goodly portion of the stem tube 33 and the exhaust tube 34 is usually melted down in order to cause the vitreous material to flow completely around the intermediate seal wire section 38 of the leading-in wires 31 and 32 and results in the passage in the exhaust tube 34 being sealed over.

The next operation to the partly formed stem occurs at station 10 and is substantially that occurring at station 11, the next in order. At station 10 and at station 11, other sets of the burners 50 and 51 continue to direct flames onto the already fused end of the stem tube 33 and air is blown into the lower openings in said stem tube 33 and said exhaust tube 34 to reshape and work the seal and open the upper end of the said exhaust tube 34 respectively. To keep the stem parts in place during the in-flow of air, the stem tube 33 is weighted down by the ring-shaped weight 52 which is lowered onto the flange thereof. The weights 52—52 are each comprised of a flanged lower portion 53 which extends up through the arm 54 and a nut 55 screwed onto the upper end of the former which, during the indexing period, rests on said arm 54. The arm 54 is attached to the upper ends of the push and guide rods 56 and 57 respectively and is kept at a height determined by the cam 58 which is engaged by the roller 59 on the arm 60 on the lower end of said push rod 56. When the weights 52 are placed on the stem tube 33, the height of the cam 58 below the roller 59 becomes less and the arm 54 moves down until the weights 52 are resting on the flange of said stem tubes 33 and takes a position midway between both the nuts 55 and the flange on the lower end of said weights 52. Heated air is then blown up the passage 40' in the support 40 for the exhaust tube 34 from jets 61 (only one being shown) which are located at these particular stations and which are connected to the source of compressed air (not shown) through the valve 62 and the pipe 63. The valve 62 controls only the operating period of the blowing operation and is actuated by the cam 64 through the lever 65 which engages said cam 64 through the roller 66 and the valve pin 67 directly. The air is heated by the flames from the burner 68 which is directed onto the pipe 63. Of the air entering the passage 40' in the support 40, only part passes through the opening 69 in the upper end 39 thereof and flows up through the exhaust tube 34 due to the limited size of said opening 69. The remainder of the air passes through the longitudinal slits in the upper end 39 of the support 40, and up the space around the exhaust tube 34 to the passages 70 (Fig. 4) in the upper larger part of the holder 35 at both sides of said exhaust tube 34 which distributes it to the interior of the stem tube 33. The said passages 70 constitute lateral enlargements of opening 35'. Sufficient air pressure is provided to force an opening through the seal from the exhaust tube 34 and to work and round out the interior of said seal to the shape shown in Fig. 5 so that the stem is more rugged and comparatively free of strains when completed.

The only remaining operations in the manufacture of the stems occur at stations 13, 14 and 16 where the burners 71, 72 and 73 respectively direct annealing flames on the stem tube 33. The remaining stations up to and including station 22 are provided to allow the stem to cool. The finished stem is removed from the head at either station 23 or 24.

If no exhaust tube is required in the stem as sometimes is the case when said stem is to be used at one end of long tubular arc lamps, this part need not be fed into the machine.

What I claim as new and desire to secure by Letters Patent of the United States is:

1. Apparatus for making stems of the class described comprising a vertically disposed hollow spindle, a holder mounted on the upper end of said spindle having openings for retaining a vitreous exhaust tube and leading-in wires in sealing relation and a seat for the lower flared end of a vertically disposed vitreous stem tube, a hollow support for the exhaust tube located within the lower end of said spindle with passages therethrough to the interior of said spindle and to the interior of said exhaust tube, means for heating the upper ends of said stem and exhaust tube to cause them to fuse together and flow about portions of the leading-in wires, and means for directing air into the lower end of said exhaust tube support for causing the air to enter said exhaust tube and blow an opening through the fused upper end of the stem and for also causing air to flow up around the said exhaust tube and through said holder to the interior of the stem tube to work and round out the seal.

2. Apparatus for making stems of the class described comprising a vertically disposed hollow spindle, a holder mounted on the upper end of said spindle having openings for retaining a vitreous exhaust tube and leading-in wires in sealing relation and a conical seat for the flared end of a vitreous stem tube with a raised edge engaging the rim of the flare to assist in positioning the stem tube, a hollow support for said exhaust tube located within the lower end of said spindle with passages therethrough to the interior of said spindle and to the interior of said exhaust tube, means for heating the upper ends of said stem and exhaust tubes to cause them to fuse together and flow about portions of the leading-in wires, and means for directing air into the lower end of said exhaust tube support for causing the air to enter said exhaust tube and blow an opening through the fused upper end of the stem and for also causing air to flow up around the exhaust tube and through said holder to the interior of the stem tube to work and round out the seal.

3. Apparatus for making stems of the class described comprising a vertically disposed hollow spindle, a holder mounted on the upper end of said spindle having openings for retaining a vitreous exhaust tube and leading-in wires in sealing relation and also having passages constituting lateral enlargements of the opening for the exhaust tube and located midway between the openings for the leading-in wires, said holder having a seat for the lower flared end of a vertically disposed vitreous stem tube, a hollow support for the exhaust tube located within the lower end of said spindle with passages therethrough to the interior of said spindle and to the interior of said exhaust tube, means for heating the upper ends of said stem and exhaust tubes to cause them to fuse together and flow about portions of the leading-in wires, and means for directing air into the lower end of the said exhaust tube support for causing the air to enter said exhaust tube and blow an opening through the fused upper end of the stem and for also causing air to flow up around the said exhaust tube and through said holder and the said passages therein to the interior of the stem tube to work and round out the seal.

4. Apparatus for making stems of the class described comprising a vertically disposed hollow spindle, a holder mounted on the upper end of said spindle having openings for retaining a vitreous exhaust tube and leading-in wires in sealing relation and a conical seat for the flared end of a vitreous stem tube, a hollow support for the exhaust tube located within the lower end of said spindle with passages therethrough to the interior of said spindle and to the interior of said exhaust tube, means for heating the upper ends of said stem and exhaust tubes to cause them to fuse together and flow about portions of the leading-in wires, means for rotating said spindle to cause the vitreous stem and exhaust tubes to be heated uniformly, and means for directing air into the lower end of said exhaust tube support for causing the air to enter said exhaust tube and blow an opening through the fused upper end of the stem and for also causing air to flow up around the said exhaust tube and through said holder to the interior of the stem tube to work and round out the seal.

5. Apparatus for making stems of the class described comprising a vertically disposed hollow spindle, a holder mounted on the upper end of said spindle having openings for retaining a vitreous exhaust tube and leading-in wires in sealing relation and a conical seat for the flared end of a vitreous stem tube, a hollow support for said exhaust tube located within the lower end of said spindle with passages therethrough to the interior of said spindle and to the interior of said exhaust tube, means for heating the upper ends of said stem and exhaust tubes to cause them to fuse together and flow about portions of the leading-in wires, means for directing air into the lower end of the said exhaust tube support for causing the air to enter said exhaust tube and blow an opening through the fused upper end of the stem and for also causing air to flow up around the exhaust tube and through said holder to the interior of the stem tube to work and round out the seal, and means for holding said stem tube in place in the holder during the last-mentioned operation.

6. Apparatus for making stems of the class described comprising a vertically disposed hollow spindle, a holder mounted on the upper end of said spindle having openings for retaining a vitreous exhaust tube and leading-in wires in sealing relation and a conical seat for the flared end of a vitreous stem tube, a hollow support for said exhaust tube located within the lower end of said spindle with passages therethrough to the interior of said spindle and to the interior of said exhaust tube, means for heating the upper ends of said stem and exhaust tubes to cause them to fuse together and flow about portions of the leading-in wires, means for directing air into the lower end of said exhaust tube support for causing the air to enter said exhaust tube and blow an opening through the fused upper end of the stem and for also causing air to flow up around the exhaust tube and through said holder to the interior of the stem tube to work and round out the seal, a ring-shaped weight, and means for resting the said weight on the flare of said stem tube during the last-mentioned operation to hold it in place.

EVERETT NILES.